Nov. 11, 1969      C. GARLAND      3,477,605
HIGH-PRESSURE FACILITY
Filed Sept. 29, 1967      3 Sheets-Sheet 1
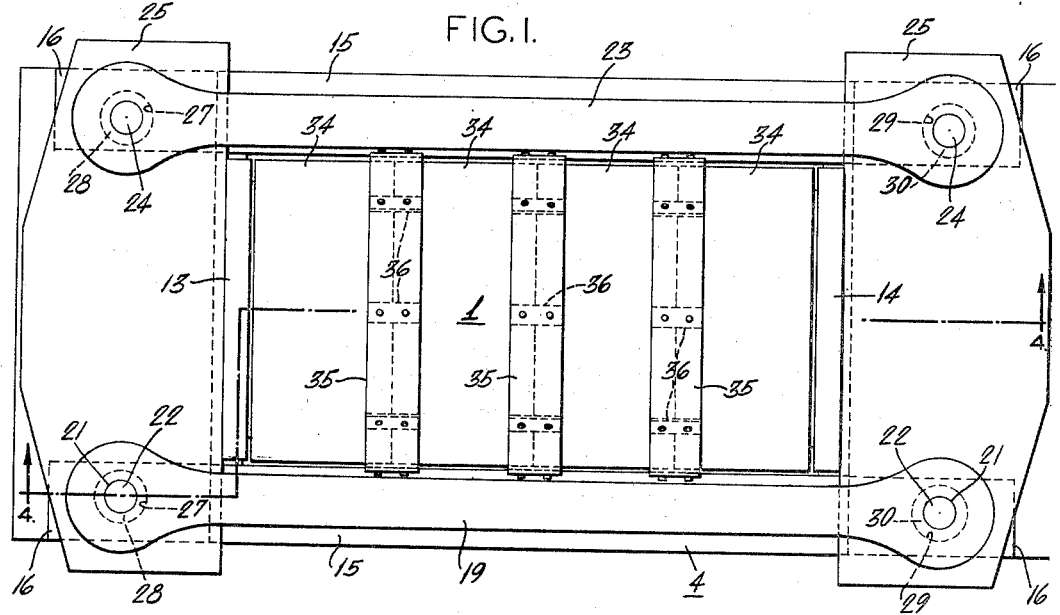
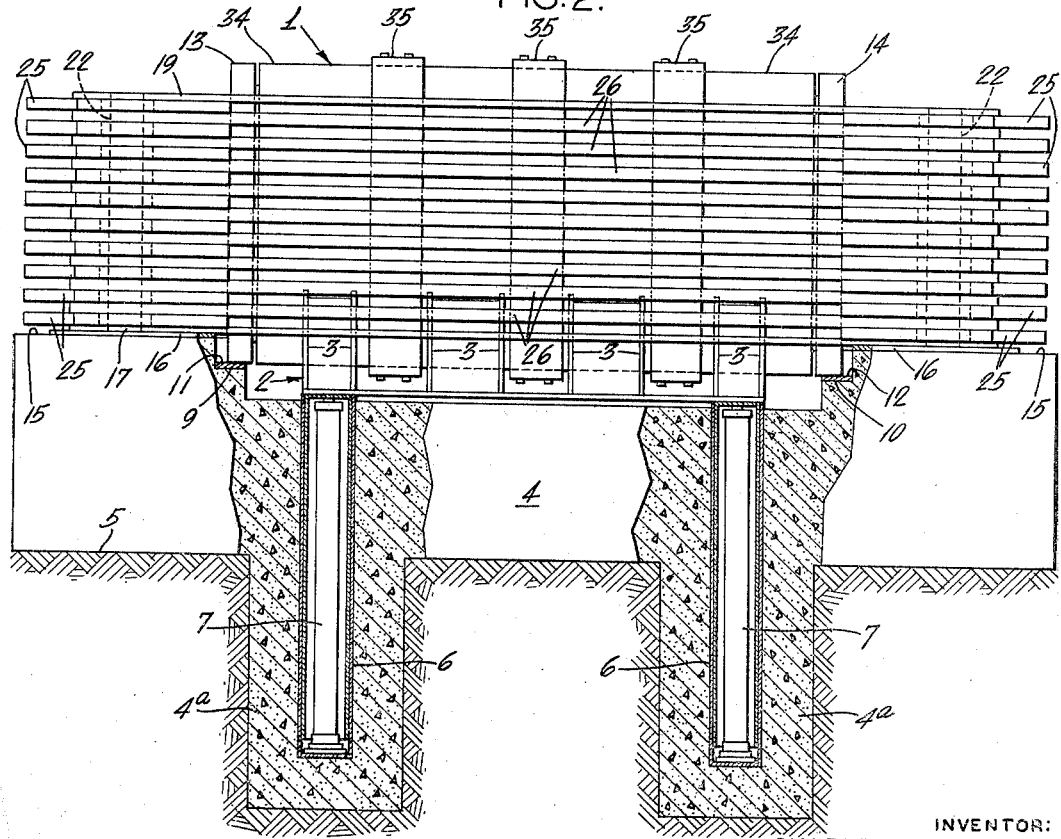
INVENTOR:
CHARLES GARLAND
BY Donald R. Johnson
ATTY.

Nov. 11, 1969

C. GARLAND 3,477,605

HIGH-PRESSURE FACILITY

Filed Sept. 29, 1967

INVENTOR:
CHARLES GARLAND
BY
Donald R. Johnson
ATTY.

Nov. 11, 1969
C. GARLAND
3,477,605
HIGH-PRESSURE FACILITY
Filed Sept. 29, 1967
3 Sheets-Sheet 3
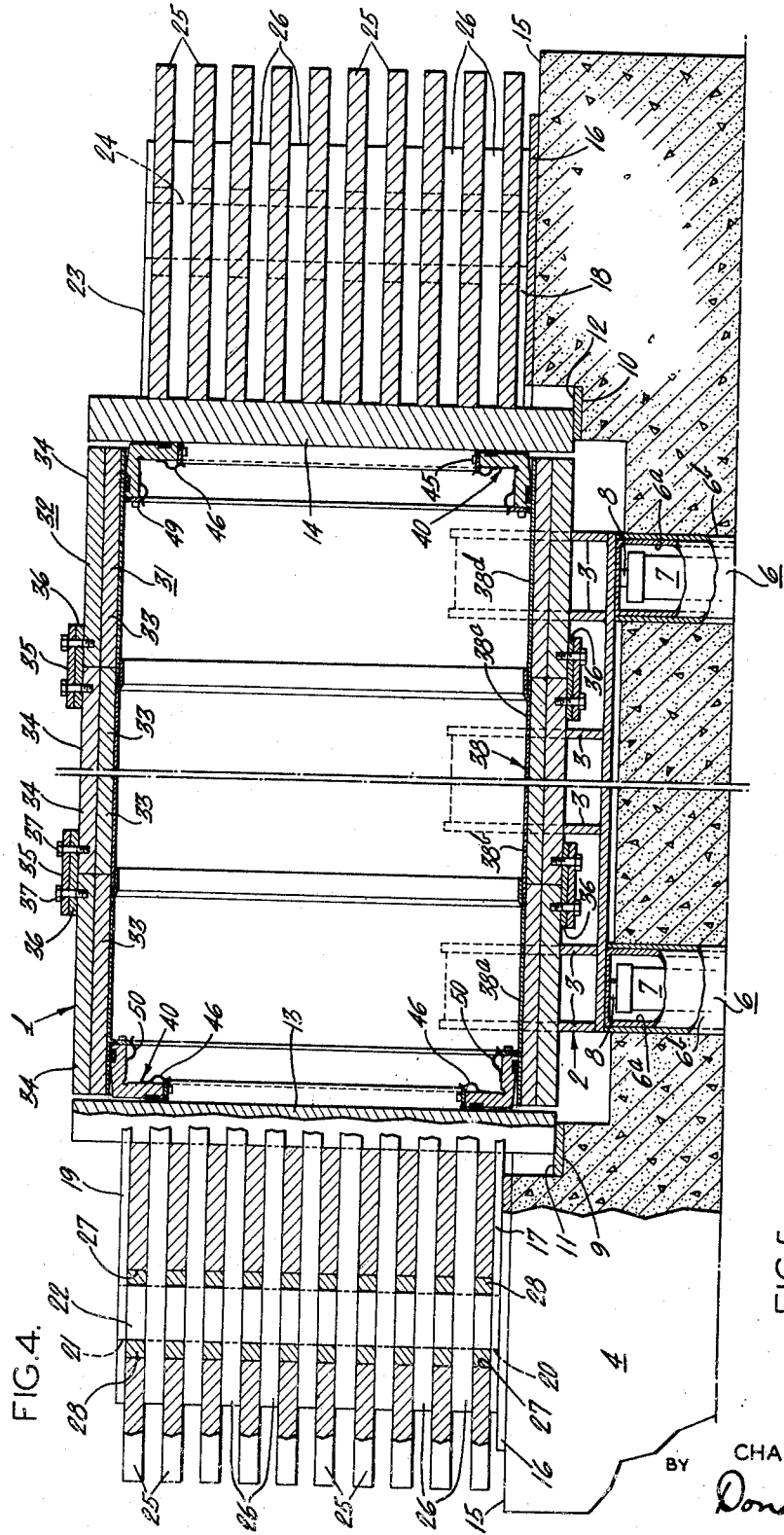
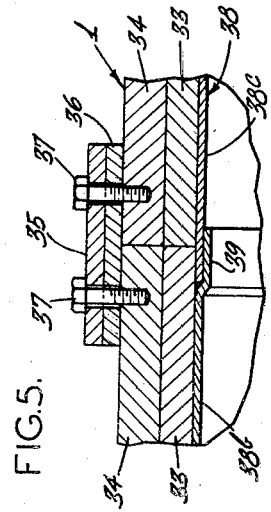
INVENTOR:
CHARLES GARLAND
BY
Donald R. Johnson
ATTY.

United States Patent Office 3,477,605
Patented Nov. 11, 1969

3,477,605
HIGH-PRESSURE FACILITY
Charles Garland, Aston Township, Chester, Pa., assignor to Sun Shipbuilding & Dry Dock Company, Chester, Pa., a corporation of Pennsylvania
Filed Sept. 29, 1967, Ser. No. 671,874
Int. Cl. F17c *1/00;* B65d *7/42*
U.S. Cl. 220—3                                    3 Claims

ABSTRACT OF THE DISCLOSURE

An open-ended cylindrical shell, formed from a suitable high-strength steel, is positioned with its longitudinal axis extending substantially horizontally, the shell being movable bodily in a vertical direction by means of an elevator mechanism. A pair of stationary end closures are provided for the shell, these closures being rigidly secured together by coupling members located outside the shell, in such a way as to prevent displacement of the closures in a direction away from each other. The shell is selectively movable by the aforementioned elevator mechanism into operative relationship with the end closures, to form a closed chamber, or out of operative relationship with the end closures, to allow access to the interior of the shell.

---

This invention relates to a high-pressure facility, and more particularly to a high-pressure test chamber. For the testing of apparatus under extremely high pressures (e.g., 12,000 p.s.i. working) such as those to which the apparatus would be subjected when submerged to great depths in the ocean, there has arisen a need for test chambers of a substantial size; typically, such a chamber might be cylindrical, with a diameter on the order of ten feet and a length on the order of twenty-two feet. The fabrication and welding onto the shell of a conventionally-desiged domed head of this diameter (and of the necessary thickness to withstand such high pressure) presents insurmountable difficulties; also, the fabrication of the body or shell of the vessel by welding techniques would be very difficult. Moreover, for a test chamber one end closure would need to be removable (to allow access to the interior thereof), and the design of a removable closure of the required size and strength is likewise difficult.

An object of this invention is to provide a large-size vessel capable of withstanding very high pressures, without resorting to welding techniques.

Another object is to provide a high-pressure test chamber (including end closures) of non-welded construction.

A further object is to provide a novel closure arrangement for high-pressure test chambers.

A still further object is to provide a novel and convenient arrangement for providing access to the interior of a high-pressure test chamber of substantial size.

The objects of this invention are accomplished, briefly, in the following manner: An open-ended cylindrical shell, formed from a plurality of ring members positioned in abutting (juxtaposed) end-to-end relationship, is positioned with its longitudinal axis extending substantially horizontally and is provided with a suitable elevator mechanism whereby it may be bodily raised or lowered at will. A pair of fixed, parallel end closures of disc shape are arranged to cooperate with the respective ends of the shell, the shell being movable by the aforementioned elevator mechanism from a position wherein it is in operative relationship with the end closures (and wherein the closures and the shell together form a closed chamber) to a position wherein it is out of operative relationship with the end closures (in which latter position access may be had to the interior of the shell via the open ends thereof), and vice versa. A rigid open framework, of generally rectangular outer configuration and located outside of the shell, couples the end closures together and prevents displacement of the end closures in a direction away from each other (and thus in a direction away from the shell, when the latter is in operative relationship with the end closures). A pair of sealing members, one at each respective end of the shell, provide seals between the ends of the shell and the respective end closures.

A detailed description of the invention follows, taken in conjunction with the accompanying drawings, wherein:

FIG. 1 is a top or plan view of the high-pressure facility of this invention;

FIG. 2 is a side elevation of the facility, with a portion of the foundation broken away for purposes of clarity;

FIG. 4 is a sectional view of the facility, taken on line 4—4 of FIG. 1;

FIG. 5 is a fragmentary sectional view, on an enlarged scale, showing a detail.

Figure 3:
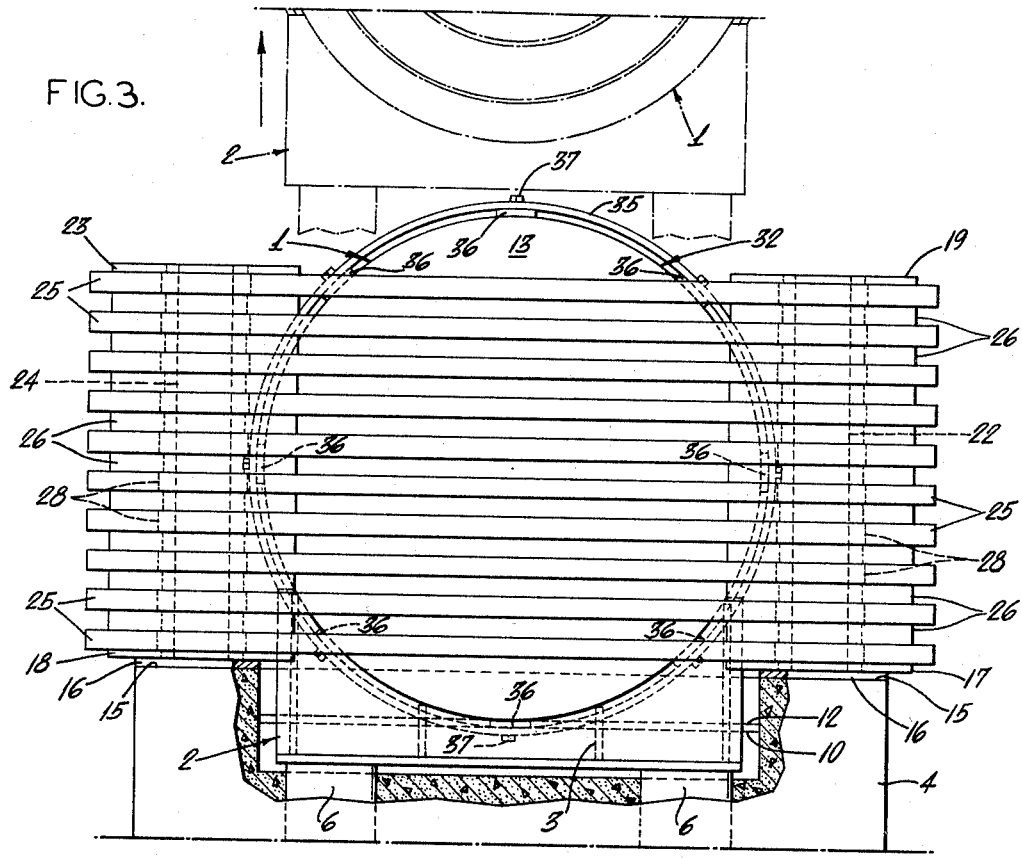
FIG. 3 is an end view of the facility, a portion of the foundation being broken away for purposes of clarity.

Referring first to FIGS. 1–4, an elongated open-ended cylindrical shell, denoted generally by numeral 1, is positioned with its longitudinal axis extending substantially horizontally, shell 1 being supported in this position by means of a cradle assembly 2 having a plurality of rigid upright structural members 3 which engage the cylindrical outer surface of shell 1, at the bottom and lower sides thereof. Shell 1 typically may have an I.D. of ten feet two inches and a length of twenty-two feet; it is of a laminated and segmented construction, as will be described subsequently in connection with FIGS. 4 and 5. For the present, it will suffice to merely say that the wall of shell 1 is sufficiently strong to withstand high internal pressures (typically, a hydrotest pressure of 15,000 p.s.i.) without rupturing.

A concrete pit-type foundation 4, the main bulk of which extends above the ground level 5, provides the supporting base for the facility. Cast in this foundation, at the respective corners of a rectangle, are four hollow tubular vertical columns 6 each composed of an inner sleeve 6a and an outer sleeve 6b. The center lines of the columns 6 may be spaced apart sixteen feet in the direction of the longitudinal axis of shell 1, and 8½ feet in the direction transverse to this axis, by way of example; the center of the rectangle just mentioned is located below but in vertical alignment with the center of shell 1. The lower ends of the column 6 are located within respective leg extensions 4a of the foundation 4; these leg extensions may extend 9 feet 8 inches below the ground line 5.

An elevator mechanism is provided for raising and lowering the shell 1, as desired during the operation of the facility for test purposes. This elevator mechanism comprises four hydraulic cylinders 7 (each having a twelve-foot stroke, for example) one of which is mounted in each of the columns 6. Cradle assembly 2 is rectangular in plan, and the movable portions or pistons 8 of the hydraulic cylinders 7 engage the underside of the cradle assembly, one piston near each of the four corners of this assembly. Thus, the cradle assembly 2 (and the shell 1, supported by this assembly) rests on the hydraulic cylinders 7, and these cylinders may be actuated when desired to raise shell 1 bodily, in a vertical direction, a maximum distance of twelve feet from the position illustrated in FIG. 2, by means of the cradle assembly 2.

The foundation 4 is provided with two horizontal ledges 9 and 10 which are located adjacent the respective opposite ends of shell 1 and are somewhat above the depressed central portion of the foundation (in which latter portion the columns 6 and the cradle assembly 2 are located). A horizontal transversely-extending wear plate 11 is mounted on ledge 9, and a similar wear plate 12 is mounted on ledge 10.

A disc-shaped forward end closure 13, made of a suitable high-strength steel, is supported on plate 11 with its central or lowermost region engaging this wear plate. Closure 13 has a diameter equal to the O.D. of shell 1, and is so located that it forms a forward end closure for shell 1 when the latter is in its lowermost position illustrated in FIG. 2, that is, when the shell is in operative relationship with this end closure.

A disc-shaped aft end closure 14, similar to closure 13, is supported on plate 12 with its central or lowermost region engaging this wear plate. Closure 14 is so located that it forms an aft end closure for shell 1 when the latter is in the position illustrated in FIG. 2, that is when the shell is in operative relationship with this end closure.

It is pointed out that, when the shell is in the position illustrated in FIG. 2, a closed chamber is formed, this chamber being defined by shell 1 and the end closures 13 and 14. Sealing arrangements 40 (FIG. 4) are provided for sealing the joints between the shell 1 and the two end closures.

In its lowermost position, illustrated in FIG. 2, shell 1 is in operative relationship with the fixed or stationary end closures 13 and 14, and a closed chamber is formed, as previously stated. When access to the interior of the chamber is desired, for example for the purpose of loading or unloading the test articles, the hydraulic cylinders 7 are operated to cause them to elevate or lift the shell 1 bodily upward as a unit, in a vertical direction, by means of the cradle assembly 2. The end closures 13 and 14 remain stationary or fixed in position, so that the shell moves out of operative relationship with such closures. When the phantom lines in FIG. 3), the ends of the shell are completely uncovered or open, so that full access to the interior of the chamber is then possible.

When it is desired to again close the chamber, e.g. for a high-pressure test, the hydraulic cylinders 7 are operated in the reverse direction to lower the shell 1 as a unit into operative relationship with the end closures (this position being illustrated in FIG. 2).

Although not illustrated in the drawings, the necessary penetrations for piping (which latter might be used for pressurizing and/or depressurizing the chamber, for example) are made through the forward end closure 13. Also, whatever penetrations for instrumentation are necessary are made through this same closure 13.

It will be appreciated that, in the high-pressure facility of this invention, some means must be provided to prevent displacement of the end closures 13 and 14 in a direction away from each other, that is, to prevent the closures from being blown outwardly by the high internal pressure in the chamber. Such a means takes the form of a rigid open framework, of generally rectangular outer configuration, which couples the end closures 13 and 14 to each other.

The foundation 4 has four horizontal ledges or supporting surfaces 15, two at each of the two ends of the shell, these surfaces 15 being outside of or beyond the end closures 13 and 14 and there being one such surface at each of the diametrically-opposite sides of each end closure. Thus, in a manner of speaking, it may be said that one surface 15 is located adjacent each respective one of the four "corners" of the shell 1. A seperate steel wear plate 16 is mounted atop each respective ledge 15.

The ends of an elongated lower tie rod 17, made of a suitable high-strength steel, rest respectively on two wear plates 16 at opposite ends of the shell 1. Tie rod 17 extends in a direction substantially parallel to the longitudinal axis of the shell, at one side of the same. The ends of a similar elongated lower tie rod 18 (see FIG. 3), made of similar material, rest respectively on the other two of the four wear plates 16, the individual ones of these other two wear plates being, of course, at opposite ends of shell 1. Tie rod 18 extends in a direction substantially parallel to the longitudinal axis of the shell, at the side thereof opposite to tie rod 17. The tie rods 17 and 18 are flat plates which have uniform width throughout the major portion of their lengths, but have enlarged, arcuate end portions, so that they have a shape somewhat like a dumbbell when seen in plan. Sufficient lateral clearance is provided, between the inner edges of rods 17 and 18 and the outer surface of shell 1, to prevent any interference by the rods with the vertical movement of the shell. The tie rods 17 and 18 remain fixed in position as the shell moves.

An upper tie rod 19, similar in shape to rods 17 and 18 and made of similar material, is located above rod 17 and parallel thereto. Tie rod 19 extends in a direction substantially parallel to the longitudinal axis of the shell, at one side of the same (to wit, the same side as rod 17). The dumbbell-like shape of rod 19 (when seen in plan) may be seen in FIG. 1. Tie rod 19, like rods 17 and 18, remains fixed in position as shell 1 moves (for loading or unloading of the test articles), and there is sufficient lateral clearance between the inner edge of rod 19 and the outer surface of shell 1 to prevent interference by this latter rod with the movement of the shell.

In the two enlarged end portions of each of the tie rods 17 and 19, aligned holes 20 and 21, respectively, of rather large diameter (sixteen inches, for example) are provided, and a tie rod pin 22 is mounted in each of these two pairs of aligned holes; thus, there is one tie rod pin 22 at each respective end of the shell, on the same side thereof as tie rods 19 and 17. The lower end of each of the pins 22 rests on the upper face of the corresponding wear plate 16, and the upper end of each of these pins is preferably flush with the upper face of upper tie rod 19.

Another upper tie rod 23, similar in shape to rods 17–19 and made of similar material, is located above rod 18 and parallel thereto. Tie rod 23 extends in a direction substantially parallel to the longitudinal axis of the shell, at one side of the same (to wit, the same side as rod 18). The dumbbell-like shape of rod 23 (when seen in plan) may be seen in FIG. 1. Tie rod 23, like rods 17–19, remains fixed in position as shell 1 moves, and there is sufficient lateral clearance between the inner edge of rod 23 and the outer surface of shell 1 to prevent interference by this latter rod with the movement of the shell.

In the two enlarged end portions of each of the tie rods 18 and 23, aligned holes similar to holes 20 and 21 are provided, and a tie rod pin 24 is mounted in each of these two pairs of aligned holes; thus, there is one tie rod pin 24 at each respective end of the shell, on the same side thereof as tie rods 23 and 18. The lower end of each of the pins 24 rests on the upper face of the corresponding wear plate 16, and the upper end of each of these pins is preferably flush with the upper face of upper tie rod 23.

The two pairs of tie rod pins 22 and 24 are all made of a high strength steel (200,000 p.s.i. minimum yield strength), which may be an 18% nickel maraging steel.

Arranged alternately between the upper and lower tie rods 19 and 17, at one side of the shell, and between the upper and lower tie rods 23 and 18, at the other side of the shell, and coupled to the various tie rod pins 22 and 24, are a plurality of transversely-extending strongback members 25 and a plurality of longitudinally-extending tie rods 26. By way of example, there are a total of twenty strongbacks 25, ten at each end of the shell 1. Each of the strongbacks 25 is made of a high strength steel, similar to the material of closures 13 and 14, and each member 25 is a plate of generally rectangular outer configuration (seen in plan, as in FIG. 1), the ten members 25 at one end of the shell extending transversely across the outer face of end closure 13 (the inner edges of these ten members engaging the outer face of this end closure), and the ten members 25 at the other end of the shell extending transversely across the outer face of end closure 14 (the inner edges of these latter ten members engaging the outer face of the latter end closure). The uppermost strongback 25 at each end of the shell lies immediately below the respective adjacent ends of the two upper tie rods 19 and 23, and the lowermost strongback 25 at each end of the shell is immediately above the respective adjacent ends of the two lower tie rods 17 and 18.

At the forward end of shell 1, each of the ten members 25 thereat has, near each of its two ends and centered on the center lines of the respective tie rod pins 22 and 24, an aperture 27 of enlarged diameter (say twenty-five inches), and a bushing 28 of high strength maraging steel is positioned in each respective one of the apertures 27, the inner faces of the bushings closely surrounding the respective tie rod pins 22 and 24 at this (forward) end of the shell. Thus, there are twenty bushings 28. At the aft end of shell 1, each of the ten members 25 thereat has, near each of its two ends and centered on the center lines of the respective tie rod pins 22 and 24, an aperture 29 of enlarged diameter, and a bushing 30 of high strength maraging steel is positioned in each respective one of the apertures 29, the inner faces of bushing 30 closely surrounding the respective tie rod pins 22 and 24 at this (aft) end of the shell. Thus, there are twenty bushings 30.

The tie rods 26 are similar in outer configuration to tie rods 17–19 and 23, previously described, but are considerably thicker and are made of high strength maraging steel. There are nine tie rods 26 at each side of the shell, a total of eighteen of these rods. The nine tie rods 26 at one side of the shell extend in a direction substantially parallel to the longitudinal axis of the shell and in parallel relation to and between upper and lower rods 19 and 17; the nine tie rods 26 at the other side of the shell also extend in a direction substantially parallel to the longitudinal axis of the shell and in parallel relation to and between the upper and lower rods 23 and 18. The paired tie rod pins 22 and 24 pass vertically through corresponding holes provided at the ends of the tie rods 26. As previously mentioned, the tie rods 26 alternate in a stacked relation with the strongbacks 25, at the ends of the shell.

It will be appreciated that the tie rods 17–19, 23, 30 and 26, and the strongbacks 25, which are coupled together by the tie rod pins 22 and 24 and the bushings 28 and 30, together form a rigid open framework which is located outside of shell 1 and which in effect couples or secures the end closures 13 and 14 to each other. The aforesaid framework prevents displacement of the end closures outwardly, that is, in a direction away from each other. In other words, this framework prevents the end closures from being blown outwardly by the high internal pressure in the chamber when the chamber is in the operative position illustrated in FIG. 2 and when it is pressurized. It may be noted here that the items forming the aforementioned framework are not welded together, so that the framework can be assembled right on the site. Also, welding problems which would arise due to hard-to-weld materials or to very thick pieces (the strongbacks 25 may be 5½″ thick and the tie rods 26, 5″ thick) are entirely eliminated.

The shell 1 is of laminated construction, having an inner layer or course 31 and an outer layer or course 32 (see FIG. 4). The inner shell course 31 comprises four machined ring forgings 33 made of high strength (200,000 p.s.i. yield strength) steel which may be 18% nickel maraging steel, the forgings being juxtaposed end-to-end, but not welded together. By way of example, these ring forgings may have a wall thickness of 4¼″. The outer shell course 32 comprises four machined ring forgings 34 which are also made of high strength maraging steel and which are juxtaposed end-to-end, but are not welded together. The outer shell course forgings 34 are shrink fitted onto the inner shell course forgings 33. By way of example, the outer forgings 34 may have a wall thickness of 5¼″. The outer ends of the four end forgings 33 and 34 are arranged to come into closely-spaced relationship with the inner faces of the respective end closures 13 and 14 when the facility is in the operative position illustrated in FIG. 4. By way of example, the gaps between the end closures and the adjacent rings may be $^{11}/_{16}″$ at 12,000 p.s.i. internal pressure and $^{13}/_{16}″$ at 15,000 p.s.i. internal pressure.

It may be noted that there are three circumferential joints between the four ring forgings 33 of the inner course, and between the four ring forgings 34 of the outer course; the inner joints and the outer joints are paired, and the inner joint of each pair lies in the same vertical plane as the outer joint of the same pair (see FIG. 4).

Three reinforcing rings 35, made of high strength maraging steel, surround the respective joints between the outer forgings 34, there being one ring 35 at each respective one of these joints; each ring 35 has a length (measured in the axial direction) of say two feet, such that it can span its respective joint. A plurality of tie clips 36, made of cold rolled steel and each comprising a short (in the circumferential direction) arcuate piece of metal whose curvature matches that of the outer surface of the outer shell rings 34, are used for securing the forgings 33 and 34 together. The tie clips 36 each have a length (measured in the axial direction) equal to that of the rings 35, and these clips are mounted between these rings and the outer surface of the outer shell forgings 34 (see FIG. 5). Eight tie clips are used for each of the rings 35, these tie clips being spaced equiangularly at 45° intervals around the circumference of the rings, as illustrated in FIG. 3; thus, a total of twenty-four tie clips 36 are utilized. The tie clips 36, like the rings 35, span the joints between the ring forgings of the inner and outer shell courses; see FIG. 5. A pair of machine screws 37 are used for each of the tie clips 36, one on either side of the joint spanned by the respective clip. The heads of these screws bear against the outer surface of the respective reinforcing ring 35, and each screw passes through clearance holes in the respective reinforcing ring 35 and in the respective tie clip 36 and threads into a respective tapped hole in the respective outer ring forging 34. No welding is employed in conjunction with the tie clips 36 or the reinforcing rings 35.

Refer again to FIG. 5. See also FIG. 4. A titanium-alloy inner liner 38 is utilized in the shell 1, to seal the joints between the ring forgings of the shell courses and to protect the high strength steel of the shell from the salt water (corrosive) environment which may be present within the chamber during testing operations. The inner liner 38 is made up of a total of four pieces, just as are the inner and outer shell courses. These four pieces are generally cylindrical in outer configuration, and have such outer diameters that the outer generally cylindrical surfaces thereof closely engage the inner surfaces of the inner ring forgings 33. Three of these liner pieces, denoted by reference numerals 38a, 38b, and 38c have reduced-diameter portions 39 at one end thereof (see the detail in FIG. 5), such as to telescope into the adjacent straight cylindrical end of the immediately juxtaposed liner piece, whereas the fourth liner piece is straight cylindrical throughout its length. The three telescoped or overlapping joints so formed in the liner 38 are each located radially inwardly of a respective one of the joints between the ring forgings 33 of the inner shell course, as illustrated in FIG. 5; this liner construction thus seals the joints between the ring forgings of the shell courses.

It is pointed out that no welding is employed in the shell courses or in the liner. In connection with what has been stated previously, this means that no welding is employed anywhere in the entire high-pressure facility. Thus, problems which might arise from the welding of hard-to-weld materials, or of very thick materials, are entirely eliminated in this invention.

Figure 6:
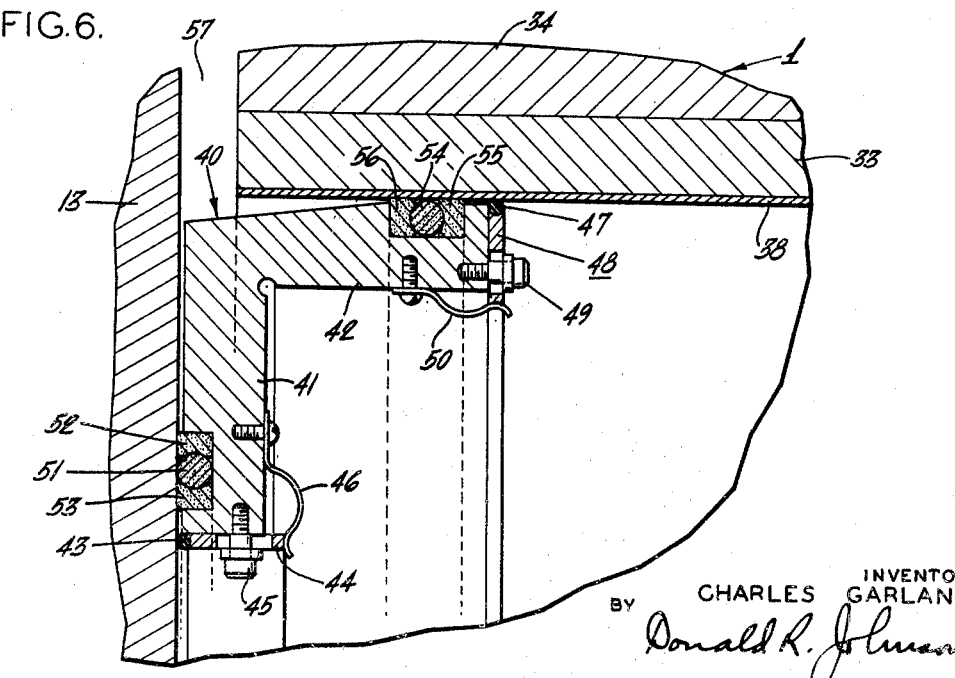
FIG. 6 is a fragmentary sectional view showing a seal arrangement.

A pair of sealing arrangements, a fragment of one of which is illustrated in FIG. 6, are used to provide seals between the ends of the shell 1 and the end closures 13 and 14, there being one sealing arrangement at each respective one of the two ends of the shell. A fragment of the sealing arrangement at the forward end of the shell is shown in FIG. 6. It is to be understood that the sealing arrangement illustrated in FIG. 6, and to be described subsequently, is duplicated at the aft end of the shell, in association with the aft closure 14. See FIG. 4. A somewhat cup-shaped member of large diameter, denoted generally by numeral 40, carries or mounts the various seals at the forward end of the shell. Member 40 is made from a suitable corrosion-resistant steel. Member 40 has an annular base portion 41 integrally joined at its edge to an axially-extending side wall portion 42. Sealing elements are carried by both portions 41 and 42; those carried by portion 41 are arranged to provide a seal between this portion and the inner circular face of end closure 13, while those carried by portion 42 are arranged to provide a seal between this latter portion and the inner cylindrical surface of the end ring forging 33.

The sealing elements carried by base portion 41 of member 40 comprise a low-pressure seal and a high-pressure seal. The low-pressure seal, which keeps water from leaking out of the chamber at the end closure 13, comprises a large-diameter seal ring (torus) 43 made of a suitable sealing material; this ring contacts the inner face of closure 13 and the ring engages and is carried by a supporting ring member 44. Member 44 is made from a suitable corrosion-resistant steel. Member 44 is secured to the cylindrical wall formed at the central opening in annular base portion 41 by means of a plurality of shoulder screws 45 which engage member 44 and thread into respective tapped holes provided in base portion 41. Screws 45 are made from a suitable corrosion-resistant steel. One or more flat springs 46, made from corrosion-resistant steel, are screwed at one end to annular base portion 41 of member 40 and bear at their opposite ends against the axially inner end of ring member 44, thereby to urge the latter (and also seal ring 43) outwardly against end closure 13.

Another low-pressure seal, quite similar in construction to that described in the preceding paragraph, is carried by side wall portion 42 of member 40. (The sealing elements carried by side wall portion 42 also comprises a low-pressure seal and a high-pressure seal.) A large-diameter ring (torus) 47 (similar to seal ring 43) contacts the inner cylindrical surface of ring forging 43 and is carried by a supporting ring member 48 similar to member 44. Member 48 is secured to the axially inner end wall of side wall portion 42 by means of shoulder screws 49 which engage member 48 and thread into respective tapped holes provided in side wall portion 42. One or more flat springs 50, similar to springs 46, are screwed at one end to side wall portion 42 of member 40 and bear at their opposite ends against the radially inner end of ring member 48, thereby to urge the latter (and also seal ring 47) outwardly against the inner wall of shell 1.

The high-pressure seal carried by base portion 41 comprises a ring-shaped seal 51 mounted on this base portion, contacting the inner face of closure 13, and centrally positioned between two back-up rings 52 and 53.

The high-pressure seal carried by side wall portion 42 comprises a ring-shaped seal 54 mounted on this side wall portion, contacting the inner face of closure 13, and centrally positioned between two back-up rings 55 and 56.

As previously mentioned, the combination of the two low-pressure seals 43 and 47 and the two high-pressure seals 51 and 54 operates to provide a seal between the shell 1 and the forward end closure 13. Elements 40–56 are duplicated at the aft end of the shell, to provide a seal between the shell 1 and the aft end closure 14, as indicated in FIG. 4.

The gap previously referred to at the end of the shell (between the end of the shell and the adjacent closure) is indicated at 57 in the larger-scale drawing of FIG. 6.

Since the member 40 is cup-shaped and is mounted within the shell, it should be apparent that the sealing assembly 40–56 at each end of the shell 1 moves upwardly with the shell when the latter is raised to provide access to the interior thereof, and then moves back downwardly with the shell when the latter is lowered into operative relationship with the end closures 13 and 14.

The invention claimed is:

1. A high-pressure facility comprising an elongated open-ended cylindrical shell having a wall sufficiently strong to withstand high internal pressures without rupturing, the longitudinal axis of said shell being substantially horizontal; a pair of fixed, parallel end closures operatively coupled to the respective opposite ends of said shell to seal such ends, said shell being arranged for vertical movement with respect to said end closures; two elongated rigid members located at respective opposite sides of said shell and extending in a direction generally parallel to the longitudinal axis of the shell, a rigid member in contact with the outer face of one of the end closures and extending across such face in a direction transverse to the longitudinal axis of said shell, means securing adjacent ends of said two elongated members to respective opposite ends of said transverse member, a rigid member in contact with the outer face of the other end closure and extending across such face in a direction transverse to the longitudinal axis of said shell, means securing the other adjacent ends of said two elongated members to respective opposite ends of the last-mentioned transverse member, and an elevator mechanism mounted in a fixed support and engaging said shell to either lower the same into operative relationship with said end closures, thereby to form a closed chamber defined by said end closures and said shell, or to raise said shell out of operative relationship with said end closures, thereby to allow access to the hollow interior of said shell by way of the open ends thereof.

2. A high-pressure facility comprising an elongated open-ended cylindrical shell arranged with its longitudinal axis extending substantially horizontally and having a wall sufficiently strong to withstand high internal pressures without rupturing, a pair of fixed, parallel end closures operatively coupled to the respective opposite ends of said shell to seal such ends, said shell being arranged for movement with respect to said end closures; means cooperating with both of said end closures and acting to prevent displacement of said end closures in a direction away from each other, and an elevator mechanism mounted in a fixed support and engaging said shell to either raise the same out of operative relationship with said end closures, thereby to allow access to the hollow interior of said shell by way of the open ends thereof, or to lower said shell into operative relationship with said end closures, thereby to form a closed chamber defined by said end closures and said shell.

3. A high-pressure facility comprising an elongated open-ended cylindrical shell having a wall sufficiently strong to withstand high internal pressures without rupturing, a pair of fixed, parallel end closures operatively coupled to the respective opposite ends of said shell to seal such ends, said shell being arranged for movement with respect to said end closures; means cooperating with both of said end closures and acting to prevent displacement of said end closures in a direction away from each other, selectively-operable means engaging said shell to either move the same into operative relationship with said end closures, thereby to form a closed chamber defined by said end closure and said shell, or to move said shell out of operative relationship with said end closures, thereby to allow access to the hollow interior of said shell by way of the open ends thereof, and a separate sealing arrangement at each end of the shell, each of said sealing arrangements operating to seal the joint between one end of the shell and the adjacent end closure when said shell is in operative relationship with the end closures, each of said two sealing arrangements being carried by a separate respective closure seal member positioned within said shell.

References Cited

UNITED STATES PATENTS

| | | | |
|---|---|---|---|
| 547,155 | 10/1895 | Ogden | 220—45 |
| 1,725,302 | 8/1929 | Riddle et al. | 187—8.59 |
| 2,360,391 | 10/1944 | Birchall | 220—3 |
| 2,578,039 | 12/1951 | Bonnell et al. | 220—71 XR |
| 3,141,390 | 7/1964 | McAlpine | 187—17 XR |
| 3,279,644 | 10/1966 | Robertson. | |
| 3,365,786 | 1/1968 | Takemora et al. | 220—3 |
| 3,225,953 | 12/1965 | Wolfe | 220—71 XR |
| 3,404,796 | 10/1968 | Dobbins et al. | 220—83 XR |

RAPHAEL H. SCHWARTZ, Primary Examiner

U.S. Cl. X.R.

220—71